July 17, 1934. G. C. AUSTIN 1,966,701
PISTON
Filed April 29, 1930
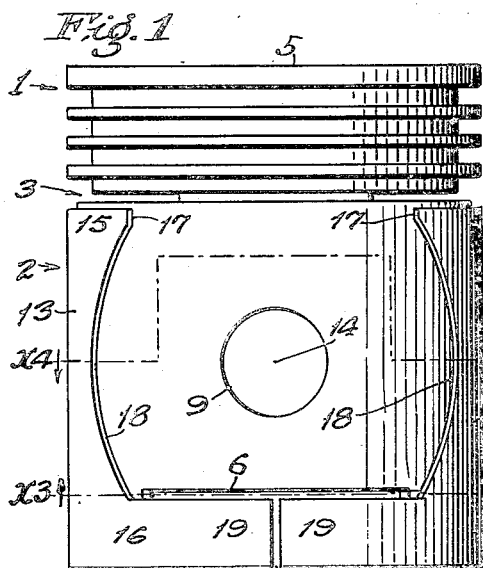
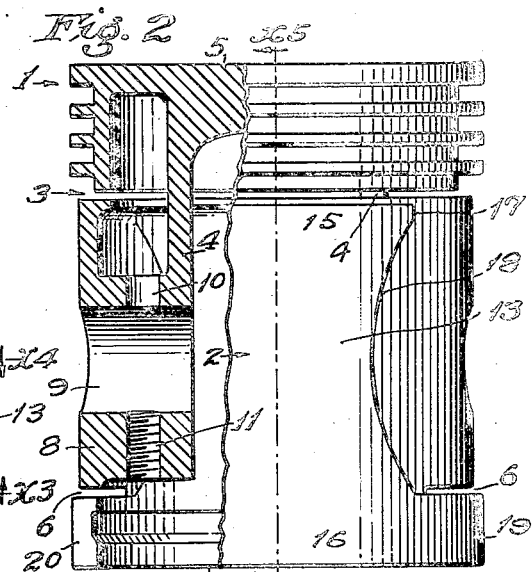
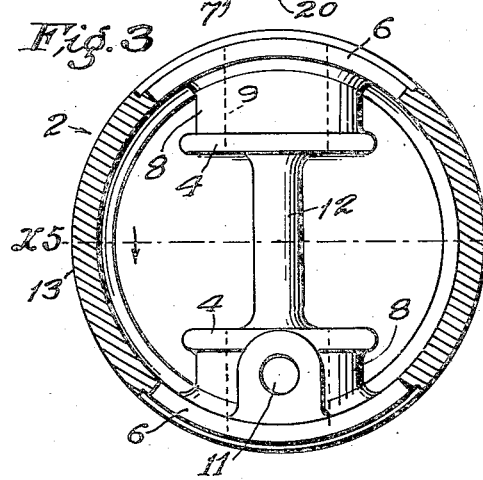
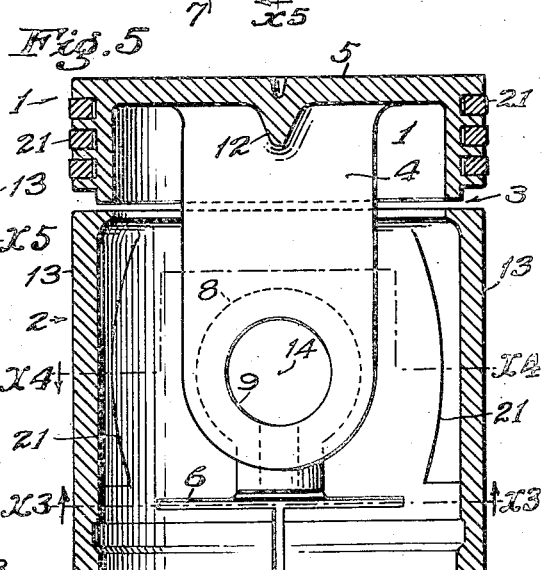
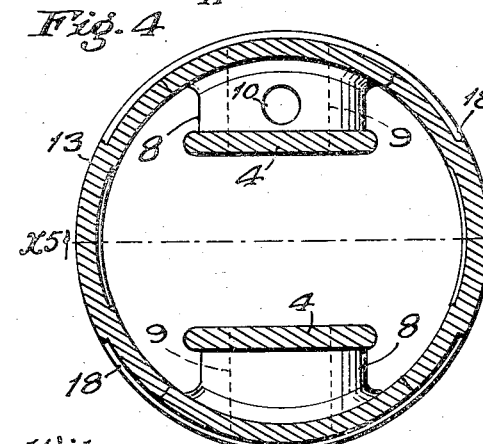
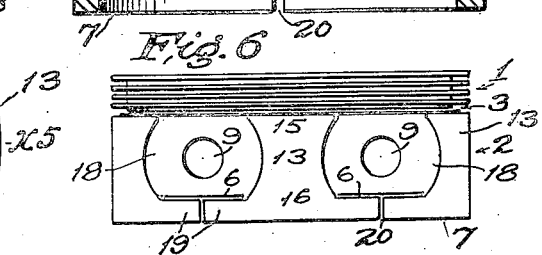
Witness
C. H. Whitmore
Inventor
George C. Austin
by James R. Townsend
his atty

UNITED STATES PATENT OFFICE 1,966,701

PISTON

George C. Austin, Alhambra, Calif., assignor, by mesne assignments, to Lewis W. Christophel, Redondo Beach, Calif.

Application April 29, 1930, Serial No. 448,236

6 Claims. (Cl. 309—11)

This invention relates to pistons for use in cylinders of internal combustion engines, air compressors, pumps, and the like. Such pistons slidingly fit the inside of the cylinder, and are subject to be scored by their travel in the cylinder.

An object of this invention is to so construct the piston that it will be less subject to scoring than former pistons for such cylinders, and will be well balanced and adapted to move freely.

Pistons of this character are provided with annularly grooved heads having expanding piston rings compressed into the grooves and expansible therein so that when the piston is installed in the cylinder it fits steam, air and gas tight; and such pistons are also provided with skirts having in their opposite sides, holes for the wrist pin of the rod by which the piston is connected to the crank pin of the crank shaft.

The operation of driving the crank causes lateral pressures on the piston and it is desirable that the sides of the piston opposite the produced axis of the connecting rod pin shall be adapted to withstand a pressure and wear greater than the sides through which the pin is inserted and the piston is provided with inwardly extending bosses that form bearings for the pin; and such bosses are extended as columns to stiffen the piston skirt and to connect the head to the skirt; the head being otherwise free from the skirt.

The end of the skirt opposite the piston head is also slitted in the axial plane of the piston in which the axis of the pin holes lies, to avoid scoring arising from friction of the skirt due to expansion.

Heretofore, pistons have been provided with pin relief recesses and this invention relates more particularly to the construction and arrangement of the piston with respect to the pin relief recesses.

It has been customary in the manufacture of pistons of this type to oppositely recess the exterior of the piston skirt on its sides, adjacent to, and around the pin holes so that there is a clearance between the skirt and the cylinder bore adjacent the pin holes; and this invention in one of its features relates particularly to the construction of the periphery of the piston skirt relative to the wrist pin holes; and in this respect my improvement consists in providing the piston with longitudinal slides terminally expanded at the piston skirt ends and each having an intermediate neck the opposite edges of which are symmetrically arcuate, so that the slides are of reduced width at the middle of the skirt and will have wide bearing surfaces at the ends of the skirt where the slides practically encircle the skirt. I make the edges of such slides of an approximately semi-circular form so that the middles of the necks are uniformly spaced from the holes for the piston rod pins.

An advantage of this construction and arrangement is a better balance for the piston, and a reduction of the tendency of the piston and cylinder to become scored.

An object is to provide better support for the piston with respect to bearings which support the thrust of the connecting rod of the piston.

Another object of the invention is to so dispose the material of the skirt or body that the expansion of the piston or skirt caused by heat may be relieved without distortion of the bearing faces or slides of the piston.

The improvement is applicable in some of its features to the usual trunk type piston and also to the usual split skirt types of piston.

Other objects, advantages and features of invention may appear from the accompanying drawing, the subjoined detailed description and the appended claims.

The accompanying drawing illustrates the invention.

Figure 1 is a side elevation of a piston constructed in accordance with this invention and viewed in alinement with the axis of the wrist pin holes; the piston rings being omitted.

Fig. 2 is a view at right angles to Fig. 1, showing the piston of Fig. 1, broken and partly in section to expose interior construction.

Fig. 3 is a section on line $x3$, Figs. 1 and 5, looking up.

Fig. 4 is a section on irregular line $x4$—$x4$, Figs. 1 and 5, looking down.

Fig. 5 is an axial section on line $x5$, Figs. 2, 3 and 4; the rings are shown in place and sectioned in their expanded position.

Fig. 6 is a developed view of the perimeter of the piston.

In the form shown in the drawing, the piston is of that type consisting of a head 1 and a skirt 2, peripherally separated from each other as by the annular peripheral slot 3, and interiorly connected to each other by the columns 4 which extend inside the piston from the closed end 5 of the piston head to peripheral slots 6 near the open end 7 of the piston; the skirt being provided with the internal bosses 8 and the pin holes 9 in which the wrist-pin, not shown, may be secured by a lock screw pin, not shown, fixed in the seats 10 and 11 therefor, in the usual way; the piston head being reinforced by a rib 12 made integral with the closed head 5 of the piston, and extending between the columns 4.

In this invention the skirt is provided with external slides 13 on the sides of the skirt opposite to the axis 14 of the wrist pin seats, said slides forming semi-cylindrical peripheral portions of the skirt between the ends of the skirt and between the wrist pin seats to fit the inside of a cylinder. The terminals 15, 16 of said slides are expanded at the ends of the skirt; the slides at the end of the skirt, adjacent the piston head, having lateral limbs 17, the adjacent ends of which are separated from each other peripherally of the skirt about 90 degrees. The lateral edges of the slides are of an arcuate form so that the skirt has recesses 18 on each side, around the pin holes, from slot 3 to slot 6. At the open end of the piston, each slide terminal extends about half way around the piston, and the adjacent portions of said slide terminals are formed as straps 19, the upper edges of which border upon the peripheral segmental slots 6 near the open end of the piston.

The open end of the skirt is formed as an open cylinder end and the gap 20 is not cut until the piston is about to be made ready for assembly. This method of construction, however, has been well known to the art before my invention.

By constructing the slides in the manner set forth, the contact of the slides with the cylinder in which the piston is installed in practical operation will be continuous along the mid-width of the slides and will be interrupted between the pin seats and from end to end of the skirt.

The pin relief portions 21 of the skirts between the slots and the slides may be offset internally as indicated in Fig. 5, thus forming thin internal reinforcements for the skirts.

In this construction and arrangement the usual piston rings 21 maintain a tight fit in the usual manner for the head inside the piston, and the slides from end to end of the skirt, contact with the walls of the cylinder, practically fitting the cylinder all the way around at the open end of the piston; the portions of the slides adjacent the piston head on those sides of the skirt toward which the oblique lateral thrust of the piston rod is directed, being adapted to apply such thrust through the slides at the portions of the piston against which the outward thrust is applied most severely, thus resisting the tendency to score; while the recessed portions 18 of the skirt are entirely free from any danger of scoring, and the terminal straps 19 of the skirt tend to maintain equilibrium of the piston and to prevent uncertain action or vibration of the piston at its open end.

I claim:—

1. A piston having a head grooved for piston rings and a skirt peripherally separated from each other provided with longitudinal bosses having wrist pin holes, and with slides on its sides opposite to the axis of the wrist pin holes; and provided between the longitudinal slides with arcuate wrist pin relief recesses surrounding the pin holes; the lateral edges of the slides being arcuate in form so that the skirt has arcuate recesses on each side around the pin holes, from slot to slot.

2. A piston having a head and a skirt attached to the head, but separated therefrom by an annular slot, and provided with wrist pin holes and with semi-circular peripheral slots near the open end of the piston, and provided between its ends with oppositely arranged arcuate recesses surrounding the wrist-pin holes and extending from the annular slots at the head end of the skirt to the slots near the open end of the piston to prevent scoring of the piston.

3. A piston having external longitudinal slides and arcuate recesses between the slides, and also having thin internal reinforcements for the skirt between the slides; the longitudinal edges of the slides being arcuate between their ends and the slides at the open end of the piston practically forming a cylindrical terminal for the piston.

4. In a piston in which the head and skirt are connected together by columns interiorly of the piston and are peripherally separated from each other by an annular slot, and in which the skirt is provided with transversely extending wrist-pin holes; longitudinal external slides forming semi-cylindrical peripheral portions of the skirt between the ends of the skirt and between the pin holes, to fit the inside of a cylinder; the terminals of said slides being expanded at the ends of the skirt; the slides at the end of the skirt adjacent the piston head having lateral limbs, the adjacent ends of which are separated from each other peripherally of the skirt, for about one-quarter of the circumference of the piston; the longitudinal edges of the slides being arcs of a circle having its center at the axis of the wrist-pin holes; and arcuate slots below said wrist-pin holes, the skirt being arcuately recessed on each side around the pin holes from slot to slot to prevent scoring of the piston.

5. A piston having a peripherally separated head and skirt connected to each other internally of such head and skirt, the skirt being provided with wrist-pin holes, and provided between the pin holes on opposite sides of the skirt with longitudinal slides, the adjacent edges of which slides are arcuate; said longitudinal slides being reduced in width between their ends; and the ends of said slides at the terminals of the skirt being expanded so that the contact of the slides with the interior of the cylinder in which the piston is to operate, will be continuous along the mid-width of the slides and will be interrupted between the pin seats from end to end of the skirt to prevent distortion of the slides of the piston and avoid scoring of the cylinder and piston.

6. A piston provided with longitudinal slides terminally expanded at the piston skirt ends and each having an intermediate neck the opposite edges of which are symmetrically arcuate, so that the slides are of reduced width at the middle of the skirt and will have wide bearing surfaces at the ends of the skirt where the slides practically encircle the skirt; the longitudinal edges of said slides being of an approximately semi-circular form so that the middle of the necks are uniformly spaced from the holes for the piston rod pin giving a better balance for the piston, and resulting in a reduction of the tendency of the piston and cylinder to become scored.

GEORGE C. AUSTIN.